(12) United States Patent
Walker et al.

(10) Patent No.: US 6,641,648 B2
(45) Date of Patent: Nov. 4, 2003

(54) PASSIVE FILTRATION SYSTEM

(75) Inventors: David H. Walker, Winchester, MA (US); Edward Godere, Marlborough, MA (US); Harris Gold, Lexington, MA (US); R. Edwin Hicks, Waban, MA (US); Robert Kaiser, Winchester, MA (US)

(73) Assignee: Foster-Miller, Inc., Waltham, MA (US)

(*) Notice: Subject to any disclaimer, the term of this patent is extended or adjusted under 35 U.S.C. 154(b) by 0 days.

(21) Appl. No.: 10/123,563

(22) Filed: Apr. 16, 2002

(65) Prior Publication Data

US 2002/0166811 A1 Nov. 14, 2002

Related U.S. Application Data (60) Provisional application No. 60/284,321, filed on Apr. 17, 2001.

(51) Int. Cl.$^7$ ............................................. B01D 53/04
(52) U.S. Cl. ..................... 96/134; 96/135; 96/153; 55/385.2; 55/521; 55/524; 454/354
(58) Field of Search ...................... 96/153, 154, 134, 96/135, 142; 55/315, 318, 385.2, 482, 485, 487, 521, 524; 454/187, 354

(56) References Cited

U.S. PATENT DOCUMENTS

| | | |
|---|---|---|
| 4,181,513 A | 1/1980 | Fukuda et al. |
| 4,978,650 A | 12/1990 | Coughlin et al. |
| 5,030,423 A | 7/1991 | Obee et al. |
| 5,109,916 A | 5/1992 | Thompson |
| 5,462,693 A | 10/1995 | Ichimura et al. |
| 5,492,882 A | 2/1996 | Doughty et al. |
| 5,505,825 A | 4/1996 | Gold et al. |
| 5,514,197 A | 5/1996 | Den |
| 5,565,077 A | 10/1996 | Gold et al. |
| 5,607,647 A | 3/1997 | Kinkead |
| 5,626,820 A | 5/1997 | Kinkead et al. |
| 5,698,012 A | 12/1997 | Yoshikawa |
| 5,714,126 A | 2/1998 | Frund |
| 5,733,348 A | 3/1998 | Skarsten |
| 5,752,985 A | 5/1998 | Nagafune et al. |
| 5,772,738 A | 6/1998 | Muraoka |
| 5,776,607 A | 7/1998 | McCullough |
| 5,792,720 A | 8/1998 | Ro et al. |
| 5,827,355 A | 10/1998 | Wilson et al. |
| 5,834,114 A | 11/1998 | Economy et al. |
| 5,837,644 A | 11/1998 | Nakanishi et al. |
| 5,840,245 A | 11/1998 | Coombs et al. |
| 5,985,112 A | 11/1999 | Fischer |
| 6,123,617 A | 9/2000 | Johnson |
| 6,155,432 A | 12/2000 | Wilson et al. |
| 6,258,300 B1 | 7/2001 | Burchell et al. |
| 6,287,023 B1 | 9/2001 | Yaegashi et al. |
| 6,302,934 B1 | 10/2001 | Nabata et al. |

FOREIGN PATENT DOCUMENTS

GB    2 137 608    10/1984

OTHER PUBLICATIONS

Cheremisinoff, Paul N., and Ellerbusch, Fred, editors, *Carbon Adsorption Handbook*, Ann Arbor Science Publishers, Inc., Ann Arbor, Michigan, 1978, pp. 355–357 and 879–903, 905–922.

Cheremisinoff, Nicholas P. and Cheremisinoff, Paul N., editors, *Carbon Adsorption for Pollution Control*, P.T.R Prentice–Hall, Inc., Englewood Cliffs, New Jersey, 1993, pp. 16, 94–95 and 144–167.

*Primary Examiner*—Frank M. Lawrence
(74) *Attorney, Agent, or Firm*—Iandiorio & Teska (57) ABSTRACT

A filter system including a housing with an intake and an outlet, a pleated carbon filter disposed between the intake and the outlet for filtering out vapors entering the intake, and a hydrophobic solution dispersed about the pleated carbon filter to inhibit adsorption of water thereby increasing the adsorption capacity of the pleated carbon filter especially in high relative humidity environments. The hydrophobic solution is selected so that it does not decrease the adsorption capacity of the carbon filter. Also disclosed is a method of making such a filter.

47 Claims, 6 Drawing Sheets

PASSIVE FILTRATION SYSTEM

PRIORITY CLAIM

This application claims priority from Provisional Patent Application Serial No. 60/284,321 filed Apr. 17, 2001.

FIELD OF THE INVENTION

This invention relates to a passive filtration system comprising of a combined particle filter and carbon adsorption filter that is capable of simultaneously capturing chemical and biological warfare agents and other toxic agents, such as toxic industrial chemicals, that does not depend on a detection system for activation, and prevents the spread of chemical and biological agent contamination released in one portion of a commercial building or military facility to other portions of the building or facility. The particle filter traps chemical warfare agent aerosols and biological warfare agents by particle filtration and the carbon filter prevents chemical warfare agents and other toxic agent vapors and gases from escaping by adsorption. The passive filtration system also has the capability to remove all types of indoor air contaminants leading to poor indoor air quality (IAQ) including volatile organic contaminant (VOC) gases, aerosols and particulates normally found in commercial buildings.

This invention also relates to a passive carbon filter with unique water adsorption inhibiting characteristics that can substantially increase the operating life of the filter and which is therefore especially useful in environments where humidity degrades the adsorption performance of the filter.

BACKGROUND OF THE INVENTION

Carbon has long been used in filters. One problem with carbon as a filtering medium, however, is that it adsorbs water and can quickly lose its adsorption capacity in environments where the relative humidity is not or cannot be controlled. And, even in commercial buildings where the humidity is controlled or in environments where the humidity is naturally low, the useful life of a carbon filter is still not very long.

Carbon regeneration systems are known. See, for example, Cheremisinoff, Paul N., and Ellerbusch, Fred, editors, *Carbon Adsorption Handbook,* Ann Arbor Science Publishers, Inc. Ann Arbor, Mich., 1978; Cheremisinoff, Nicholas P. and Cheremisinoff, Paul N., editors, *Carbon Adsorption for Pollution Control,* P.T.R Prentice-Hall, Inc., Englewood Cliffs, N.J., 1993; and U.S. Pat. Nos. 5,565,077 and 5,505,825. But, in many environments, regeneration systems add to the cost and complexity of the filter and, in addition, could cause a concentrated discharge of toxic contaminants, captured by the filter.

In this invention, a long life passive filtration system that is always on-line and which does not require regeneration is disclosed. In one example, a room is equipped with several ceiling tiles including the passive filtration system of this invention. If terrorists set off a canister in the room which releases aerosolized chemical and/or biological warfare agents, the high efficiency particle filter of the system filters out all of the aerosols so that they are not circulated to other rooms in the complex by the heating, ventilation, and air conditioning (HVAC) system of the complex. The pleated carbon filter of the system adsorbs any vapors released from the high efficiency filter due to vaporization of the captured aerosol and other gases that pass through the particle filter. The HVAC system will draw all its return air from within the room through the passive filters. To eliminate air leakage problems through ceiling light fixtures and other room openings and also provide better control of airflow within rooms, a power-vented panel is recommended for use in plenum HVAC returns, making the panel the path of least resistance for the airflow.

SUMMARY OF THE INVENTION

It is therefore an object of this invention to provide a passive filtration system.

It is a further object of this invention to provide such a filtration system which is continuously online.

It is a further object of this invention to provide such a passive filtration system which does not require a carbon regeneration subsystem.

It is a further object of this invention to provide such a filtration system which does not require excessive power or any other control input.

It is a further object of this invention to provide such a filtration system which is not disruptive and which does not provide false alarms.

It is a further object of this invention to provide such a passive filtration system which typically has no or few moving parts and which requires little maintenance.

It is a further object of this invention to provide such a filtration system which is easily installed in existing ceiling grids.

It is a further object of this invention to provide such a filtration system which has a very low pressure drop and does not require modifications to existing HVAC equipment.

It is a further object of this invention to provide such a filtration system to minimize air leakage through ceiling light fixtures and other room openings and allow all of the airflow through the filtration panel.

It is a further object of this invention to provide such a filtration system which is highly visible so that unauthorized removal or tampering thereof can be immediately detected.

It is a further object of this invention to provide such a filtration system which has a life expectancy of at least five years under background concentrations of indoor air contaminants including VOCs, aerosols, particulates and other allergens, normally found in commercial buildings.

This invention results from the realization that a pleated carbon felt filter treated with a silane based organofunctional hydrophobic solution inhibits the adsorption of water thereby increasing the adsorption capacity of the pleated carbon filter especially in high relative humidity environments. The hydrophobic solution is selected so that is does not decrease the adsorption capacity of the carbon filter and so that it can thus filter out harmful vapors. The carbon felt material may also be treated with reactive metals to enable the treatment of various acid and alkaline gases not otherwise treated by unimpregnated carbon fiber material.

This invention features a filter system for passive filtration comprising a housing with an intake and an outlet, a pleated carbon filter disposed between the intake and the outlet for filtering out vapors entering the intake, and a hydrophobic solution dispersed about the pleated carbon filter to inhibit adsorption of water thereby increasing the adsorption capacity of the pleated carbon filter especially in high relative humidity environments. Preferably, the hydrophobic solution is selected so that it does not decrease the adsorption capacity of the carbon filter. One such solution is a silane composition.

In one example, the pleated carbon filter is made of carbon felt material, there is approximately one pleat per inch and the carbon felt material is approximately 5 mm thick. In the same example, the housing is approximately 4 inches deep and each pleat is approximately four inches high.

Further included may be one or more reactive metals disposed in the carbon filter to render toxic gases entering through the intake non-toxic. Typical reactive metals include copper, zinc and molybdenum. In one embodiment, a high efficiency particle filter is disposed adjacent the intake opening of the housing for filtering aerosols before they enter the intake, one or more lower efficiency filters are located adjacent the high efficiency filter, and a blower is disposed at the outlet of the housing to increase the flow through the intake.

This embodiment is useful in a room with a plurality of tiles forming a ceiling and wherein select tiles are replaced with the passive filters of this invention: a housing with an intake and an outlet, a pleated carbon filter made of carbon felt material disposed between the intake and the outlet for filtering out vapors entering the intake, and a hydrophobic silane solution dispersed in the pleated carbon felt material filter to inhibit adsorption of water by the carbon thereby increasing the adsorption capacity of the pleated carbon filter especially in high relative humidity environments. The housing may be 2 feet wide by 10 inches deep and 2 feet long or 4 feet long. A high efficiency particle filter may be disposed adjacent the intake opening of the housing for filtering aerosols before they enter the intake and one or more lower efficiency filters are typically located adjacent the high efficiency filter. A blower disposed at the outlet of the housing of selected filters increases the flow therethrough and generates a pressure above the ceiling greater than the pressure below the ceiling.

This invention also features a method wherein a pleated carbon filter disposed between the intake and the outlet of a housing is treated with a hydrophobic solution dispersed about the pleated carbon filter to inhibit adsorption of water thereby increasing the adsorption capacity of the pleated carbon filter especially in high relative humidity environments. The hydrophobic solution is selected so that it does not decrease the adsorption capacity of the carbon filter. One such solution is a silane composition.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Filter system 10, FIGS. 1–5, in accordance with this invention, typically includes housing 12 with intake 14 and outlet 16 and pleated carbon filter 18 disposed therebetween for filtering out vapors entering intake 14. In the preferred embodiment, two layers of carbon felt material, each 2.5 mm thick for a total thickness of 5 mm, made by PAL (Tiapan, China), and available from Carbon Resources (Huntington Beach, Calif.), was pleated to have a four inch depth and there was approximately one pleat per inch. As discussed in the Background section above, the capacity of this material is severely degraded in high humidity environments and was thus treated with a hydrophobic solution as discussed below to inhibit water adsorption.

System 10, in this example, may also include high efficiency (99.9995%) ULPA particle filter 20 disposed adjacent intake opening 14 of housing 12 for filtering aerosols entering intake 14. Prefilter 22 may also be included adjacent high efficiency filter 20 and comprising, in one example, low efficiency pleated filter 32, FIG. 5 (65% efficiency) and lower efficiency filter 34 (20% efficiency). And, in the preferred embodiment, filter 10, FIG. 1 includes blower 24 disposed on panel 26 covering outlet 16 of housing 12 to, inter alia, increase the flow through intake 14.

Figure 2:
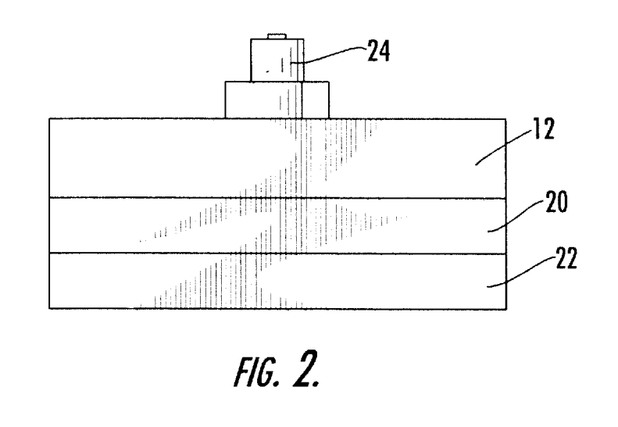
FIG. 2 is a front view of the assembled passive filtration system shown in FIG. 1.

As shown in FIG. 2, when assembled in a ceiling tile configuration, the complete system is 2 ft×2 ft or 2 ft×4 ft square and 14.5 inches in total height. Housing 12 is 4 inches tall, ULPA filter 20 is 3 inches tall, and prefilter 22 is also 3 inches tall.

Figure 1:
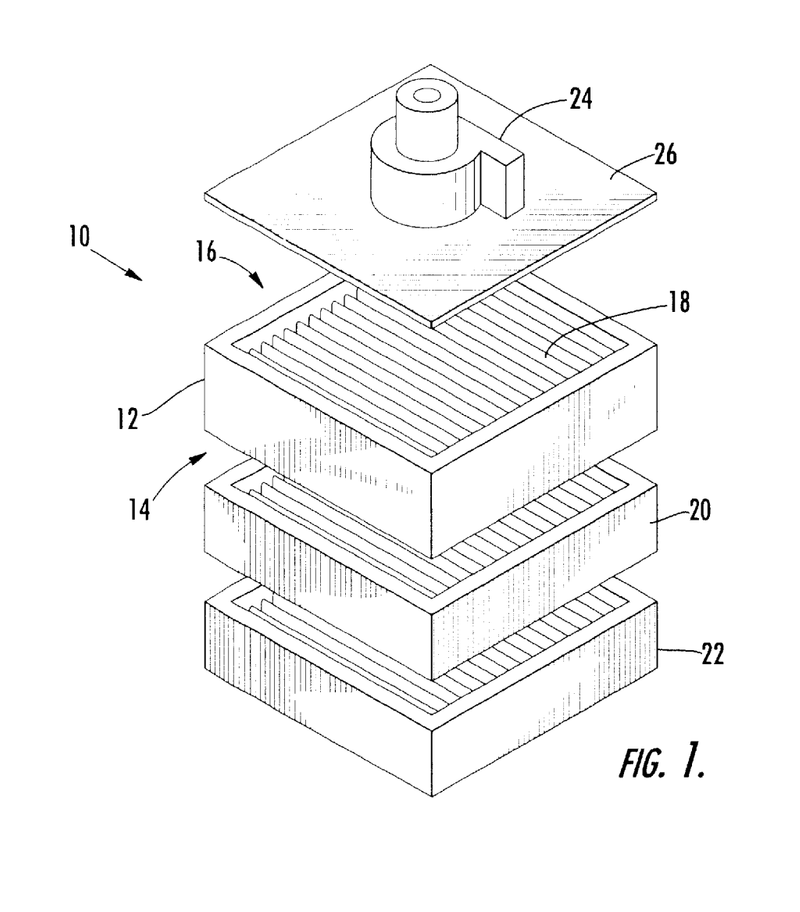
FIG. 1 is a schematic exploded view of one embodiment of the passive filtration system of this invention.
Figure 7:
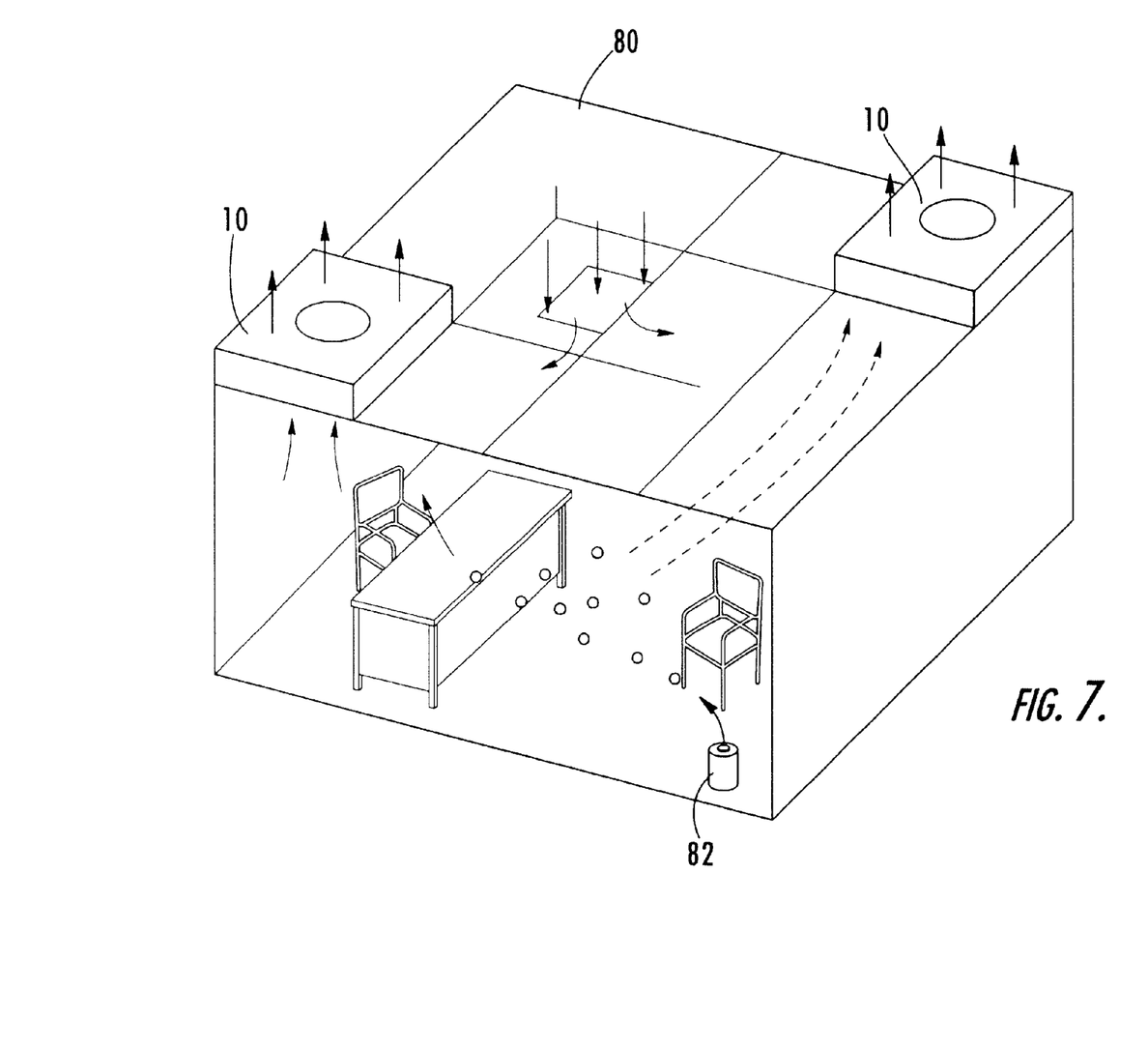
FIG. 7 is a schematic view showing one specific implementation of the filter system of the subject invention.

FIG. 7 depicts room 80 equipped with two filter systems 10 wherein select ceiling tiles are replaced with the unique passive filter shown in FIG. 1. The intake of each filter faces the room floor and the outlet of each filter is disposed in the space above the ceiling tiles. In this way, if aerosized canister 82 is set off to release aerosolized chemical and/or biological warfare agents, the high efficiency system of this invention filters out all the aerosol so that they are not circulated to other rooms in the complex by the HVAC system of the complex. Pleated carbon filter 30, FIG. 3, filters out any vapors released by high efficiency filter 20, FIG. 4.

These "capture" filter panels are intended for implementation in so-called "Immune Buildings" as a means to provide passive protection to the building occupants by eliminating the spread of contamination through the return side of the HVAC system. The approach involves the use of ceiling tile filter units capable of simultaneously capturing chemical and biological warfare agents. The filters are combined particle filters and carbon adsorption beds. The combination of air filter media and carbon felt traps aerosols and agents by particle filtration, and prevents chemical warfare agent vapors and gases from escaping by adsorption.

Figure 8:
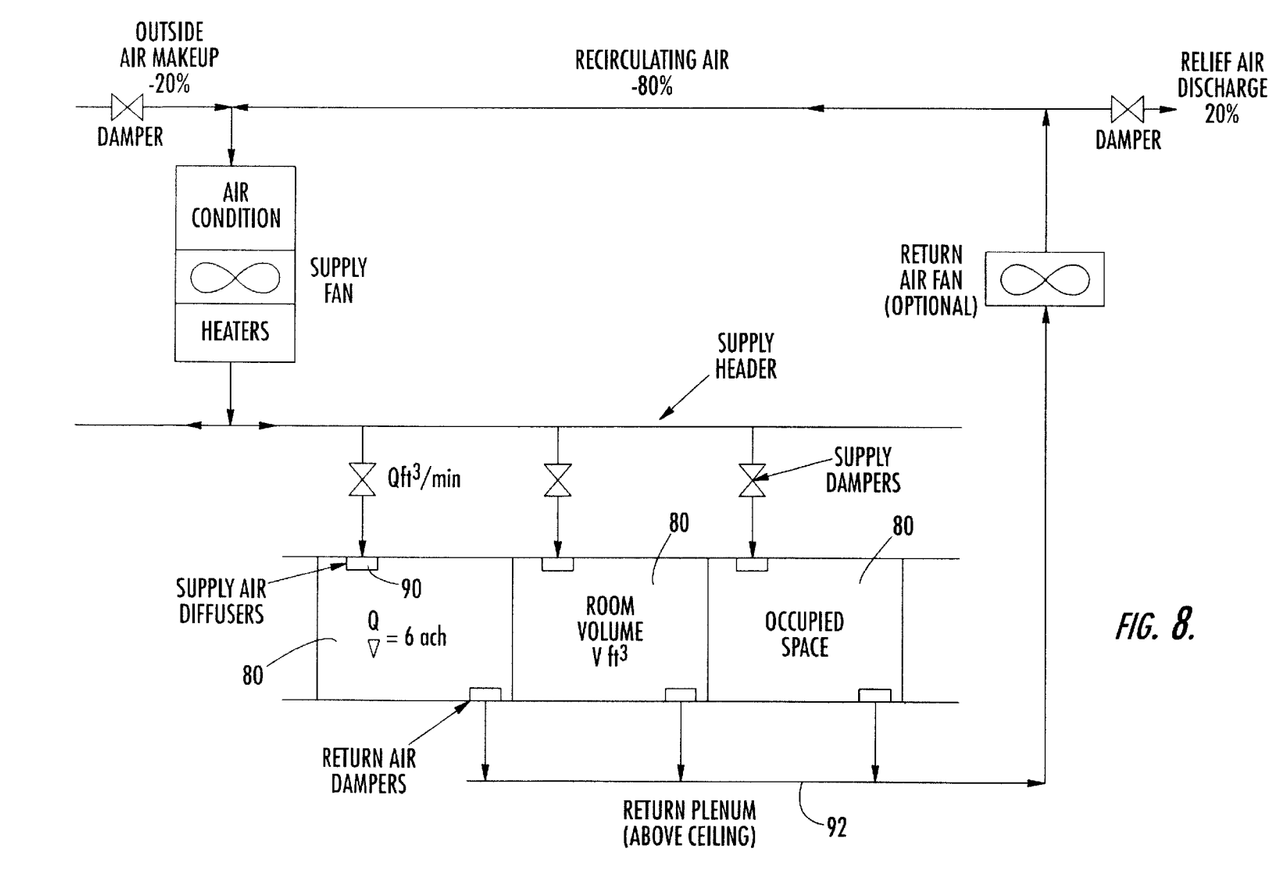
FIG. 8 is a diagram showing the primary components of typical building HVAC system.

Typically, filter panels 10 are integrated into the ceiling of each room within an immune building and employed with an above the ceiling plenum air return to the HVAC system, conceptually shown in FIG. 8. The HVAC system will draw all its return air from within the room through the filters. To eliminate air leakage problems and also provide better control of airflow within rooms, blower assembly 24, FIG. 1 is recommended for use in plenum returns. This approach makes the panel the path of least resistance for the airflow.

Installing the filter panels as ceiling tiles provides a high surface area for agent capture and, moreover, the panels can be located anywhere in the room so that the panels can provide maximum protection during a release. The filter panels do not require periodic regeneration even when operated continuously against background concentrations of volatile organic compounds (VOCs). Cleanable and replaceable pre-filters 22, FIG. 5 protect the panels from clogging with dust.

Figure 4:
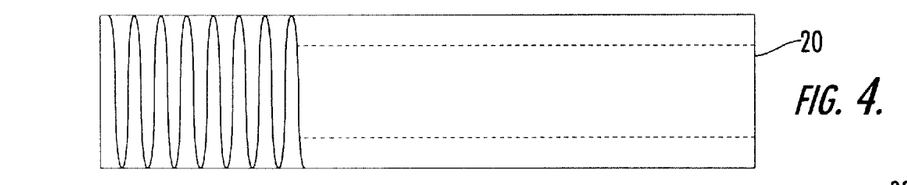
FIG. 4 is a cross sectional schematic view of a high efficiency Ultra-Low Penetration Air (ULPA) filter useful in connection with the filtration system of this invention.
Figure 5:
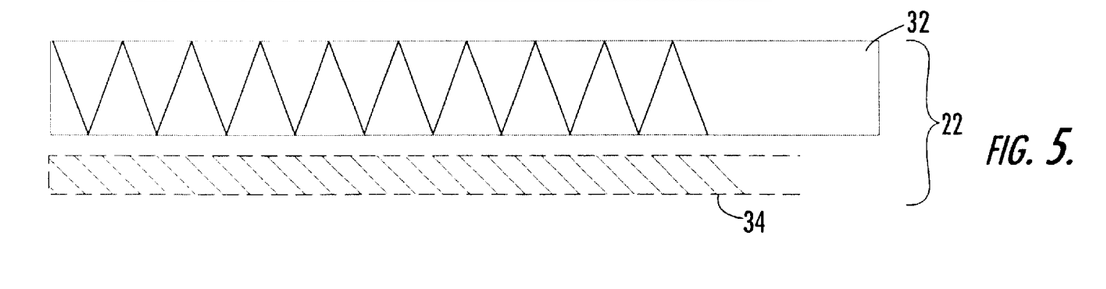
FIG. 5 is a cross sectional view showing optional lower efficiency prefilters useful in the filtration system of the subject invention.

For the filter panels shown, ULPA filter 20, FIG. 4 is integrated with flat panel pre-filter 22 and a pleated activated carbon felt filter 14, FIG. 1 to provide the required level of protection. Carbon felt filter 14 provides a minimum breakthrough time of 20 minutes for high vapor pressure blister agents and (at an inlet concentration of 3,000 ppm). Laboratory testing evaluated the performance of integrating these media types into filter panels configurations. Particulate filter efficiency of an ULPA filter (99.9995%) was measured at typical return air velocities. The total agent adsorption capacity of a single panel 10 is on the order of 770 g.

As discussed above, power-vented filter panels with blower units 24 are recommended for plenum returns. The panel blowers overcome any added pressure drop of the panels so that no modification of the central HVAC blowers is required. For ducted returns, the filter panels will increase slightly the total static pressure of the HVAC blower. In most instances this increased pressure can be obtained by a speed change of the existing blower (change motor and blower pulleys). System 10 can be configured as either 2'×2' or as 2'×4' panels to accommodate a standard drop ceiling construction. Panel weight will be on the order of 10 lb. for a 2×2 panel. Approximately 4 panels are needed per 100 ft$^2$ of floor area. These weights are not excessive for standard ceiling support rails. If necessary, support wires, similar to those used for light fixtures could be employed.

Adequate sealing of openings and cracks can be accomplished through the use of heavier weight tiles (gypsum board vs. fiberglass) and gasket strips along the rail. Light fixtures, fire extinguisher heads, etc., must also be sealed to prevent air leakage. Ceiling construction of this type is now used in clean rooms. Components from clean room ceilings could be used in immune buildings as well.

Sealing requirements are greatly reduced by the use of power-vented filter panels. The airflow through the panels must be greater than that supplied by the central HVAC system. Tests of the panels suggest that the panel air flow should be 20 percent greater than the room air flow. This excess flow through the panels tends to pressurize the plenum relative to the room. This pressurization forces air from the plenum to flow into the room through openings in the ceiling. When a chemical or biological agent is released into the room, the air blowing from the plenum prevents the agent from entering the plenum. The agent is forced through the filter panels where the agent is captured.

The components and operating characteristics of a typical building HVAC system are illustrated in FIG. 8. As shown, the ventilation air is supplied to the room through diffuser 90, mixes with and entrains air already in the room, and is then withdrawn through a grille into return plenum 92. Instead of using duct work, the return plenum is often just the space between the ceiling and floor above. The return air is then mixed with a fixed proportion of makeup air from the outside, passes through various dust filters, air conditioners, and heaters, and is then recycles to the occupied space.

Guidelines published by ASHRAE and other organizations recommend values for the ventilation rate and the proportion of outside air according to the use of the room and type of facility. In a preliminary design, calculations used values typical of an office environment, namely a 20% outside air makeup rate and a room ventilation rate of 6 air changes per hour (ach)—that is a flow rate equivalent to 6 room volumes per hour. A 10 ft. by 10 ft. by 8 ft. high room, with a volume is 800 cubic ft. and a ventilation rate of 6×800 ft/hr or 80 cubic feet per minute (cfm) is typical.

Terrorist threats to commercial buildings and military installations include not only the conventional battlefield chemical warfare agents, such as nerve, blister, choking, tear and blood agents, but include other types of threats, particularly acid-forming and basic toxic industrial chemicals that are relatively easy to obtain. Unlike some of the nerve agents which strongly adsorb onto activated carbon even in the presence of high relative humidity, many of the toxic industrial chemicals compete strongly with water vapor for adsorption sites on the activated carbon. In the latter case, water vapor is preferentially adsorbed on the activated carbon, reducing the adsorption capacity and active life of the filter. The adsorption of these gases by activated carbon in humid environments can be reduced by as much as 80 to 90 percent compared to a dry environment.

Figure 6:
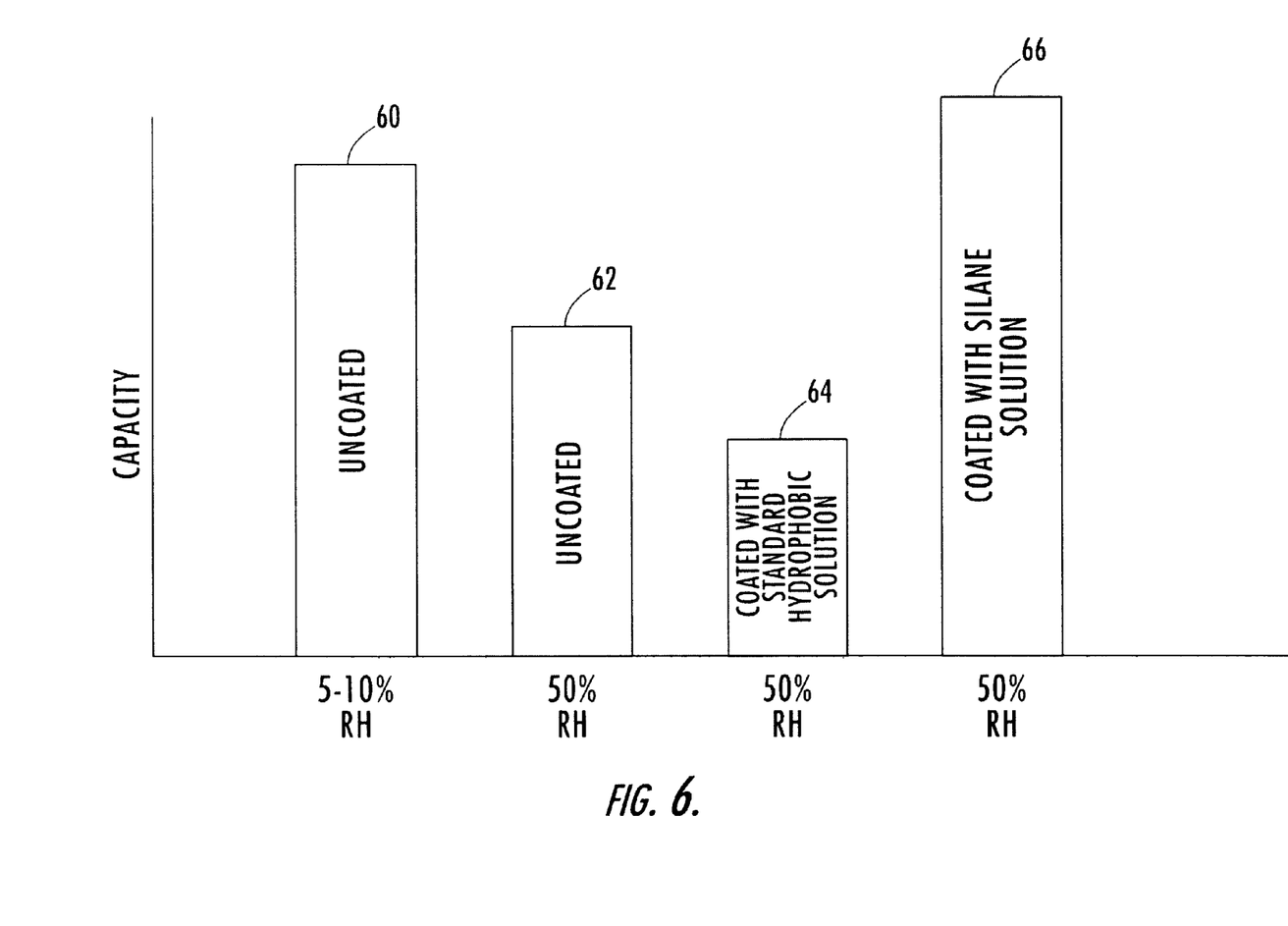
FIG. 6 is a graph showing the adsorption capacity of an untreated and a treated pleated carbon filter for trichloroethylene (TCE) at different relative humidity levels.

It is thus desirable to develop an activated carbon that has the same chemical warfare capability as the present carbon, but has the additional capability to handle a wide range of other toxic and hazardous industrial chemicals even in the presence of high relative humidity. If the pleated carbon felt material 18, FIG. 3 of filter housing 12, FIG. 1 is deployed as is from the manufacturer, its adsorption capacity is sufficient to capture vapors released from chemical warfare agent aerosols as well as chemical warfare agent gases and other industrial gases by adsorption, but only when the relative humidity is very low as shown at 60 in FIG. 6. The capacities in FIG. 6 are normalized relative to the uncoated material at low relative humidities. The felt material was challenged with TCE. TCE is not a chemical warfare agent nor is it a chemical warefare agent simulant, but having a relatively high vapor pressure, it is an especially sensitive indicator of the effects of water vapor on the ability of activated carbon to adsorb organic gases. Testing of the felt material with TCE at a relative humidity of 50 percent showed a diminution in the capacity by some 30 percent compared to a dry gas, as shown at 62. The felt material was then coated with three different hydrophobic coatings at loadings of from 0.1 to 0.2 weight percent and again tested with TCE at a relative humidity of 50 percent.

Figure 3:
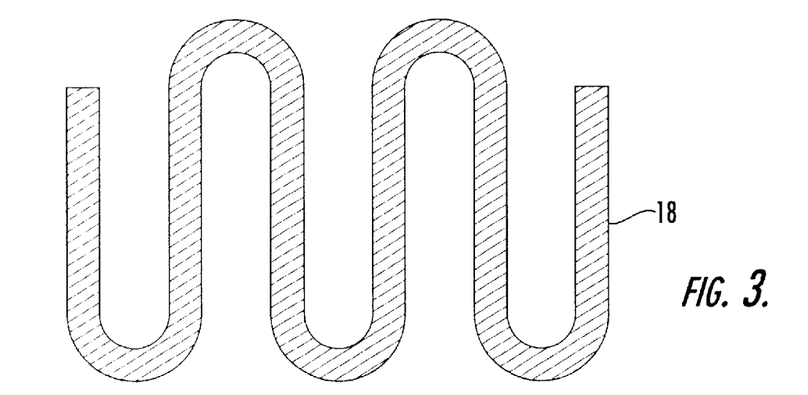
FIG. 3 is a cross sectional view of the pleated carbon filter element of the passive filtration system of this invention.

Surprisingly, when pleated carbon felt material 18, FIG. 3 was treated with a standard micropolymer hydrophobic solution such a silicone emulsion used to waterproof fibers and fabrics, the treated material at 50% relative humidity decreased to a capacity of 40% as shown at 64 of the dry uncoated case as shown at 60. Thus, treatment of the carbon felt material with a standard hydrophobic solution resulted in less adsorption capacity than even uncoated material, suggesting that the micropolymer hydrophobic solution binded to and blocked the pores of the carbon fibers of the felt material and did not make the adsorption sites op the carbon pores available to the contaminant gas, TCE.

Still, without the ability to inhibit the adsorption of water, filter system 10, FIG. 1 would not work well in environments where the relative humidity is not or cannot be controlled or without the use of a carbon regeneration subsystem. For example, in a low relative humidity environment, the pleated carbon felt material 18, FIG. 3, is expected to have a lifetime of about 5 years at background VOC concentrations normally found in commercial buildings. At a relative humidity of 50 percent, the lifetime of the carbon felt material would be reduced to about 3.5 years and would be further reduced at higher relative humidities.

Unexpectedly, by treating the carbon felt material with a silane based organofunctional solution, the adsorption capacity of the material as shown at 66, FIG. 6 at 50% relative humidity was as good or even better than the untreated material at 5–10% relative humidity. The preferred silane solution is available from Dow Chemical by Aegis Environmental Management (Midland, Mich.) and is denoted as AEM 5700. This broad spectrum anti-microbial treatment is registered with the U.S. Environmental Protection Agency to control the threat of media binding by fungal, algae, or bacterial contaminants and growths that are inevitable in occupied indoor environments and in other end-uses.

The carbon fiber material was also coated with a mixture of the two coatings and the carbon capacity for TCE at a relative humidity of 50 percent was found to be some 20 percent lower than the capacity with dry gas, only about 10 percent better than the untreated felt material.

As discovered by the inventors hereof, however, the silane solution provides not only an antimicrobial protective treatment, it also can be used as a hydrophobic solution unlike standard hydrophobic solutions to inhibit the adsorption of water by the pleated carbon filter to increase the adsorption capacity thereof especially in high relative humidity environments.

Silane based (polyalkosysilane) organofunctional coatings are well known for their durability, permeability, and versatile functionality. Such binding agents and coatings are used in a great diversity of end uses. To meet practical end-use requirements, such coatings must be safe to breathe and cannot significantly alter the adsorption or capture properties of the fiber or fiber construction properties.

Polyalkosysilane (3-trimethoxysilylprophyl dimethyl octadecyl ammonium chloride) networks also have a much higher permeability to gases than other polymers. The permeability of this network allows the cross-linked structure to be used as membranes where gas needs to be exchanged across the membrane but other molecules need to be excluded. Although the solid polymer network is bound to the substrate by close range forces, covalent bonding and/or physically locking into the microstructure of the surface, the stereochemistry of the molecule allows for permeability to various gases. It may be thought of as a "membrane" coating, which is hydrophobic due to the 18 carbon n-alkane that constitutes one end of the 3-trimethoxysilylprophyl dimethyl octadecyl ammonium chloride.

The coatings are expected to be safe to use. The AEM 5700 formulation is safe to breathe. It was also found that uncoated activated carbon fiber material is fairly friable. However, upon application with the AEM 5700 coating, the integrity of the material greatly improved.

Hydrophobic solutions other than this specific silane composition which do not decrease the adsorption capacity of the carbon filter to filter out vapors may also be used in accordance with the subject invention. The pore diameter of the activated carbon can be tailored to particular applications and can be made in the range of from 5 to 20 Angstroms. The coating should be a small fraction of the pore diameter after it is dried on the carbon surface and/or be permeable to the contaminant gas(es).

Carbon felt material 18, FIG. 3 may also be impregnated with one or more reactive metals to render toxic gases entering through the intake of the system non-toxic. Exemplary reactive metals include copper, zinc and molybdenum (in the forms of carbonates, oxides and sulfates) to treat gases that are not otherwise treated by unimpregnated activated carbon, such as acid gases (HCN, $H_2S$, $Cl_2$ and $SO_2$), alkaline gases ($NH_3$) and other organic vapors. U.S. Pat. No. 5,492,882 presents treatment data for different formulations and different granular activated carbon substrates. Other impregnants include silver and triethylenediamine (TEDA) to treat other specific contaminant gases.

The process of making activated carbon fiber starts with a precursor material. Unlike many commercial available carbon fiber materials that are made from polyacrylnitrile fibers, the felt material 18, FIG. 3 isbasically rayon materials in the form of a thick, long fiber felted blanket made of fibers about 20 to 30 μm in diameter. This continuous web of material is impregnated with a series of chemicals andthen processed through an oxidation oven in an inert atmosphere-. The higher the level of activation, the greater is the volume reduction in the size of the original web. The volume of the original web will be reduced in volume by approximately 50 to 60 percent in the manufacturing process.

The pore diameter of the 1300 $m^2/g$ BET (Brunauer-Emmett-Teller method), 200 $gr/m^2$ matte material used was approximately 17 to 20 Angstroms, but can be made in the range from 5 to 20 Angstroms. Unlike granular activated carbon which typically has a wide pore size distribution curve, the pore size distribution of activated carbon fiber is essentially a spike in which 80 percent of the total pore volume corresponds to a particular pore size. After activation, the only inert material left on the carbon fibers is a very small amount of residual nitrite, less than one percent. This material can be washed and almost all of this material can be removed, but there is a significant increase in the cost of the material for this procedure.

Felt material 18, FIG. 3 adsorbs a wide variety of chemical gases, some of which are considered toxic. For concentrations in the range of 1000 to 3000 $mg/m^3$, the capacities of over 70 contaminant gases was considered to be excellent with values greater than 30 percent, 45 gases had a capacity of between 20 and 30 percent, and about 25 of between 10 to 20 percent.

Figures 9, 10:
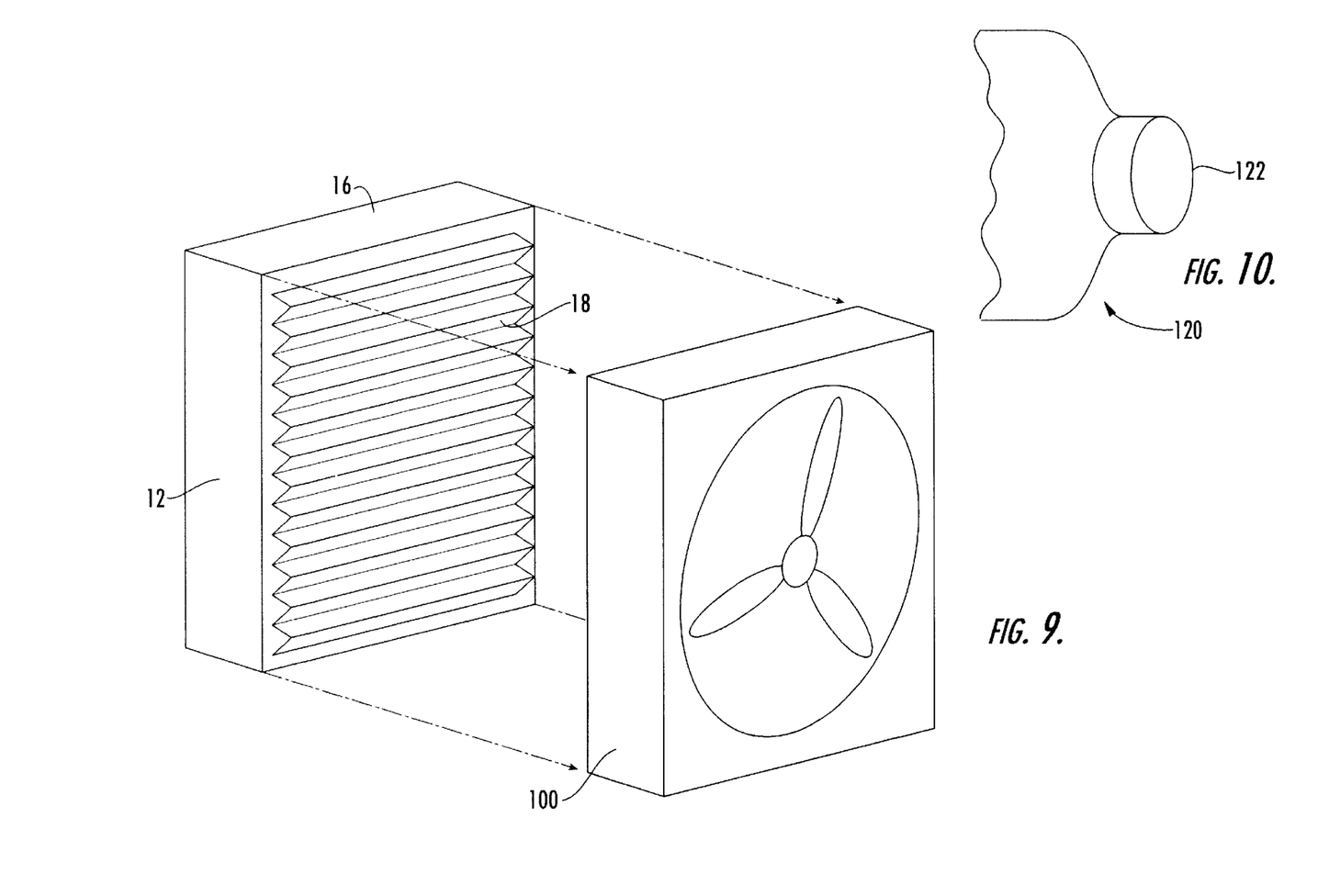
FIG. 9 is a schematic view showing another use for the filtration system of the subject invention.
FIG. 10 is a partial schematic view showing still another implementation of the filter system of this invention.

The unique pleated carbon filter of the subject invention treated with a hydrophobic solution to increase the adsorption capacity thereof in high relative humidity environments is not limited to the example shown in FIG. 1, however. As shown in FIG. 9, pleated carbon filter 16 treated as discussed above is placed closely adjacent to a HVAC fan 100 of a conventional HVAC system to filter out harmful agents including vapors, aerosols, and particles, to treat so called "sick" buildings, to reduce allergens, and the like. Another military application is schematically shown in FIG. 10 where a pleated carbon filter treated with a hydrophobic solution is used in connection with canister 122, FIG. 10 of gas mask 120.

The hydrophobic solution chosen can be dispersed about the pleated carbon filter by dipping or spraying techniques and in other embodiments there could be more than one layer of activated carbon felt material other then the single layer shown in FIG. 3. The optional use of blower 24 may be preferred in implementations such as shown in FIG. 7 to increase the flow through the filter and also to provide a pressure above the ceiling tiles in the room greater than the pressure in the room so all the filtered air goes back into the room and there are no leaks otherwise out of the room.

In this way, the passive filtration system of this invention is continuously online, does not require a carbon regeneration subsystem, does not require excessive power or any other control input, is not disruptive, and does not provide false alarms. The passive filtration system of this invention typically has no or few moving parts and requires little maintenance. It is easily installed into existing ceiling grids, has a very low pressure drop and does not require modifications to existing HVAC equipment.

The filtration system which is also highly visible so that unauthorized removal or tampering therewith can be immediately detected. The life expectancy is expected to be at least five years since the pleated carbon felt filter treated with a silane hydrophobic solution inhibits the adsorption of water thereby increasing the adsorption capacity of the pleated carbon filter especially in high relative humidity environments.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A filter system for passive filtration, the system comprising:
    a housing including an intake and an outlet;
    an active carbon filter disposed between the intake and the outlet for filtering contaminants entering the intake;
    the active carbon filter treated with a hydrophobic solution that inhibits adsorption of water vapor and enhances adsorption of a first set of chemical contaminants as compared to an active carbon filter without the hydrophobic solution in an environment having a relative humidity substantially above zero percent; and
    the active carbon filter treated with a second solution that enhances adsorption of a second set of chemical contaminants in an environment having a relative humidity at or above zero percent.

2. The filter system of claim 1 in which the pleated carbon filter is made of carbon felt material.

3. The filter system of claim 1 in which the hydrophobic solution includes a silane composition.

4. The filter system of claim 1 in which the active carbon filter is treated with a third solution having anti-microbial properties for filtration of biological contaminants.

5. The filter system of claim 1 in which the active carbon filter is treated with a gas adsorbing solution that enhances filter adsorption of radioactive gases and includes triethylenediemine (TEDA).

6. The filter system of claim 4 where the first and the third solutions include polyalkosysilane (AEM 5700).

7. The filter system of claim 1 where the second solution includes one or more reactive metals.

8. The system of claim 7 in which the reactive metals are chosen from the group consisting of copper, zinc, molybdenum and silver.

9. The system of claim 1 further including a high efficiency particle filter disposed adjacent the intake opening of the housing for filtering aerosols before they enter the intake.

10. The system of claim 9 further including one or more lower efficiency filters adjacent the high efficiency filter.

11. The system of claim 1 further including a blower disposed at the outlet of the housing to increase the flow through the intake.

12. A filter system for passive filtration, the system comprising:
    a housing with an intake and an outlet;
    a pleated active carbon filter made of carbon felt material disposed between the intake and the outlet for filtering out vapors entering the intake; and
    a hydrophobic solution including polyalkosysilane (AEM 5700) dispersed about the pleated active carbon filter.

13. The filter system of claim 1 further including one or more reactive metals and TEDA to render toxic gases entering through the intake non-toxic.

14. The system of claim 13 in which the reactive metals are chosen from the group consisting of copper, zinc, molybdenum and silver.

15. The system of claim 12 further including a high efficiency particle filter disposed adjacent the intake opening of the housing for filtering aerosols before they enter the intake.

16. The system of claim 15 further including one or more lower efficiency filters adjacent the high efficiency filter.

17. The system of claim 1 further including a blower disposed at the outlet of the housing to increase the flow through the intake.

18. A filter system for passive filtration, the system comprising:
    a housing with an intake and an outlet;
    a pleated active carbon filter disposed between the intake and the outlet for filtering out vapors entering the intake;
    a hydrophobic and anti-microbial solution dispersed about the pleated active carbon filter that includes polyalkosysilane (AEM 5700);
    a second solution dispersed about the pleated active carbon filter that includes one or more reactive metals;
    a gas absorbing solution dispersed about the pleated active carbon filter that includes triethylenediemine (TEDA);
    a high efficiency particle filter disposed adjacent the intake opening of the housing for filtering aerosols before they enter the intake; and
    a blower disposed at the outlet of the housing to increase the flow through the intake.

19. The filter system of claim 18 in which the pleated carbon filter is made of carbon felt material.

20. The filter system of claim 18 in which the hydrophobic solution includes a silane composition.

21. The filter system of claim 18 in which there is approximately one pleat per inch.

22. The system of claim 21 in which the reactive metals are chosen from the group consisting of copper, zinc, molybdenum and silver.

23. The system of claim 18 further including one or more lower efficiency filters adjacent the high efficiency filter.

24. A room equipped with a filter system comprising:
    a plurality of tiles forming a ceiling; and
    select tiles replaced with passive filters each including:
        a housing with an intake facing the room and an outlet opposing the intake,
        a pleated active carbon filter disposed between the intake and the outlet for filtering out vapors entering the intake,
        a hydrophobic solution dispersed about the pleated active carbon filter that inhibits adsorption of water vapor and enhances adsorption of a first set of chemical contaminants as compared to an active carbon filter without the hydrophobic solution in an environment having a relative humidity substantially above zero percent, and a second solution dispersed about the pleated active carbon filter that enhances adsorption of a second set chemical contaminants as compared to an untreated active carbon filter in an environment having a relative humidity at or above zero percent.

25. The system of claim 24 in which the housing is approximately 2 feet wide by 10 inches deep.

26. The system of claim 24 in which the housing is 2 feet long.

27. The system of claim 24 in which the housing is 4 feet long.

28. The system of claim 24 further including a high efficiency particle filter disposed adjacent the intake opening of the housing for filtering aerosols before they enter the intake.

29. The system of claim 28 further including on e or more lower efficiency filters adjacent the high efficiency filter.

30. The system of claim 24 further including a blower disposed at the outlet of the housing of selected filters to increase the flow therethrough and to generate a pressure above the ceiling greater than the pressure below the ceiling.

31. The system of claim 24 further including one or more reactive metals in the carbon filter to render toxic gases entering through the intake non-toxic.

32. The system of claim 24 in which the pleated carbon filter is made of carbon felt material.

33. The system of claim 24 in which the pleated active carbon filter is treated with a third solution having antimicrobial properties for filtration of biological contaminants.

34. The system of claim 24 in which the pleated active carbon filter is treated with a gas adsorbing solution that includes triethylenediemine (TEDA).

35. The filter system of claim 33 where the hydrophobic solution and the third solution include polyalkosysilane (AEM 5700).

36. A room equipped with a filter system comprising:

a plurality of tiles forming a ceiling; and select tiles replaced with passive filters each including:
   a housing with an intake facing the room and an outlet opposing the intake,
   a pleated active carbon filter disposed between the intake and the outlet for filtering out vapors entering the intake,
   a hydrophobic solution dispersed about the pleated active carbon filter that inhibits adsorption of water vapor and enhances adsorption of a first set of chemical contaminants as compared to an active carbon filter without the hydrophobic solution in an environment having a relative humidity substantially above zero percent,
   a second solution dispersed about the pleated active carbon filter that enhances adsorption of a second set chemical contaminants as compared to an untreated active carbon filter in an environment having a relative humidity at or above zero percent, and
   a blower disposed at the outlet of the housings of selected filters to increase the flow therethrough and to generate a pressure above the ceiling greater than the pressure below the ceiling.

37. A method of making a passive filtration system, the method comprising:

treating an active carbon filter material with a hydrophobic solution that inhibits adsorption of water vapor and enhances adsorption of a first set of chemical contaminants as compared to an active carbon filter without the hydrophobic solution in an environment having a relative humidity substantially above zero percent;

treating the active carbon filter with a second solution that enhances adsorption of a second set of chemical contaminants as compared to an untreated active carbon filter in an environment having a relative humidity at or above zero percent; and pleating the active carbon filter material and disposing it in a housing to form a filter.

38. The method of claim 37 in which the active carbon filter is made of carbon felt material.

39. The method of claim 37 in which the hydrophobic solution includes a silane composition.

40. The method of claim 37 where the hydrophobic solution includes polyalkosysilane (AEM 5700).

41. The method of claim 37 further including the step of treating the active carbon filter with triethylenediemine (TEDA).

42. The method of claim 37 where the second solution includes one or more reactive metals.

43. The method of claim 42 in which the reactive metals are chosen from the group consisting of copper, zinc, molybdenum and silver.

44. The method of claim 37 further including adding a high efficiency particle filter disposed adjacent the intake opening of the housing for filtering aerosols before they enter the intake.

45. The method of claim 44 further including adding one or more lower efficiency filters adjacent the high efficiency filter.

46. The method of claim 37 further including adding a blower disposed at the outlet of the housing to increase the flow through the intake.

47. The method of claim 37 further including the step of replacing select ceiling tiles in a room with the treated carbon filter material.

* * * * *